Nov. 6, 1923. 1,472,805
J. P. MENTZER
CONNECTER LINK FOR ANTISKID CHAINS
Filed Dec. 27, 1920
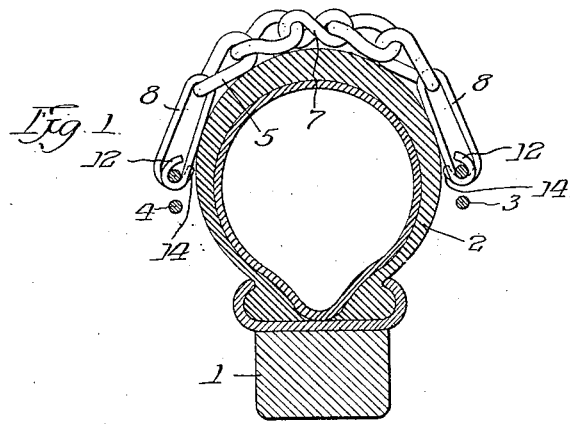
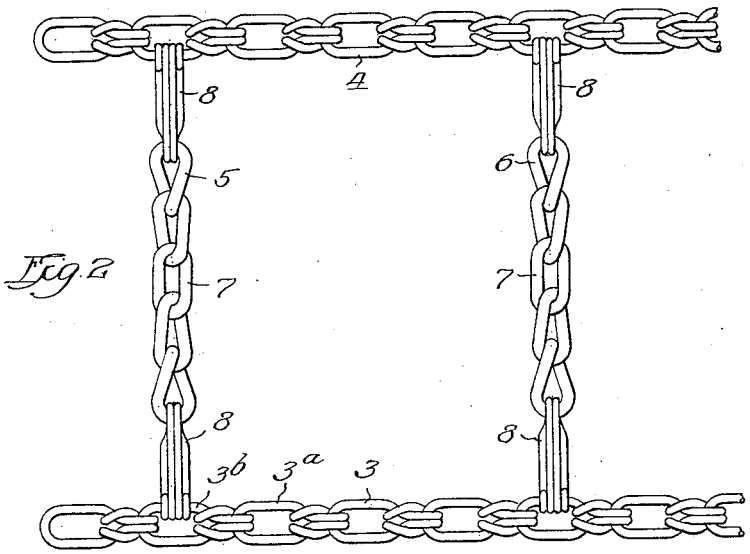
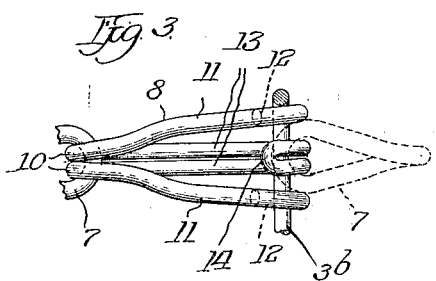
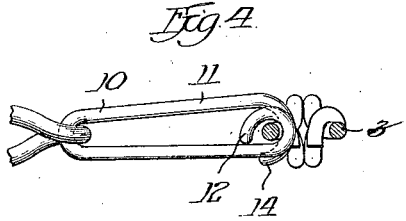
Inventor:
John P. Mentzer Patented Nov. 6, 1923.

1,472,805

UNITED STATES PATENT OFFICE.

JOHN P. MENTZER, OF CHICAGO, ILLINOIS.

CONNECTER LINK FOR ANTISKID CHAINS.

Application filed December 27, 1920. Serial No. 433,152.

*To all whom it may concern:*

Be it known that I, JOHN P. MENTZER, a citizen of the United States, residing at Chicago, in the county of Cook and State of Illinois, have invented a certain new and useful Improvement in Connecter Links for Antiskid Chains, of which the following is a full, clear, concise, and exact description, reference being had to the accompanying drawings, forming a part of this specification.

My invention relates to anti-skid chains for vehicle tires, and particularly to the means for connecting the cross chains to the side or rim chains.

One of the objects of the invention is to provide a simple and practical arrangement for fastening the cross chains to the rim or side chains.

Another object of the invention is to permit the ready connection and disconnection of cross chains and side chains.

Another object of the invention is to secure simplicity of construction and ease and quickness of operation.

In the accompanying drawings Fig. 1 is a cross section of a vehicle rim provided with a tire having an anti-skid chain embodying my invention;

Fig. 2 is a plan view of a portion of the side chain and of the cross chains;

Figs. 3 and 4 are views of parts of the chain.

Referring to the drawings I show the felly 1 of a vehicle wheel on which is mounted a pneumatic tire 2. This tire 2 is provided with an anti-skid chain having side chains 3 and 4, and cross chains 5 and 6, it being understood of course that there are more cross chains than simply the chains 5 and 6 shown in the drawings.

The side chains 3 and 4 are provided with links 3ª which are connected together at their ends. The cross chains 5 and 6 are provided with links 7—7 and connecters 8—8 by which the links 7—7 are connected to the side chains 3 and 4. These connecters 8—8 are particularly adapted to permit ready connection and disconnection between the ends of the cross chains 5 and 6 and the side chains 3 and 4.

To such end each connecter 8 comprises a length of wire or rod bent to form generally a loop 10 for engaging a cross chain link 7 and detachable connecting members at the other end for engaging the side 3ᵇ of a side chain link 3ª. To form these members the length of wire or rod which composes the connecter 8 is bent to form two top members 11—11 which are close to one another at one end, the left hand end referring to Fig. 3, but separate or diverge from each other so that at the right hand end of said connecter 8 said members 11—11 are separated to form a substantial space between them. The ends of the members 11—11 are turned or bent downwardly and thence doubled back, as shown in Fig. 4, so as to form hooks 12—12 which are adapted to encircle side portions 3ᵇ of the link 3ª. The other ends of the members 11—11 are also bent downwardly and thence doubled back on themselves as shown in Fig. 4 to form loops 10—10, and the doubled back portions extend lengthwise of the members 11—11 in a plane below the same, running preferably side by side and close to one another in the form of members 13—13, and these two members are thence doubled back on themselves to form a hook member or tongue 14 which is located between the hook members 12—12 and also encircles the link side 3ᵇ between the members 12—12. The side members 11—11 have a certain amount of spring action so that they may be moved or swung toward and away from one another to a limited extent.

The connecters 8 are intended to be secured permanently to the side chains by reason of the hook members 12—12 and 14 encircling the side 3ᵇ to such an extent as to prevent the connecters 8—8 from becoming unhooked from the links 3ª. It is also intended that the cross chain links 7—7 shall be capable of becoming detached from and attached to links 7—7 of the cross chains 5 and 6.

Such attachment and detachment is accomplished by sliding one of the cross chain links 7 between the hook members 12—12 and over the hook member 14, as indicated in Fig. 3, so that link 7 will slide first over and then down along the hook member 14, and then longitudinally along the members 13, so that said link will come into position within the loop members 10 and so be held in position. Thus a cross chain may be readily attached to a side chain by simply connecting the end link 7 of a cross chain with the sides 3ᵇ of a side chain link 3ª. Similarly a cross chain or parts thereof, in case of breakage of an intermediate link, may be disconnected from a side chain by simply slipping a link 7 along between the members 11—11 and 13—13 and then extricating it from the hook member 14, pressing the side members 11—11 slightly to one side if necessary. Thus it will be seen that a cross chain may be readily inserted in place or removed either in whole or in part and a new one put in place of the broken or separated parts.

What I claim as my invention is:

A connecter for tire chains comprising a single piece of material bent to form a loop member at one end, and three transversely contacting hook members at the other end, the two outside hook members facing in one direction and the intermediate hook member facing in another direction, and serving as a tongue over which the link of the cross chain may pass.

In witness whereof, I hereunto subscribe my name this 16th day of December, A. D., 1920.

JOHN P. MENTZER.